UNITED STATES PATENT OFFICE.

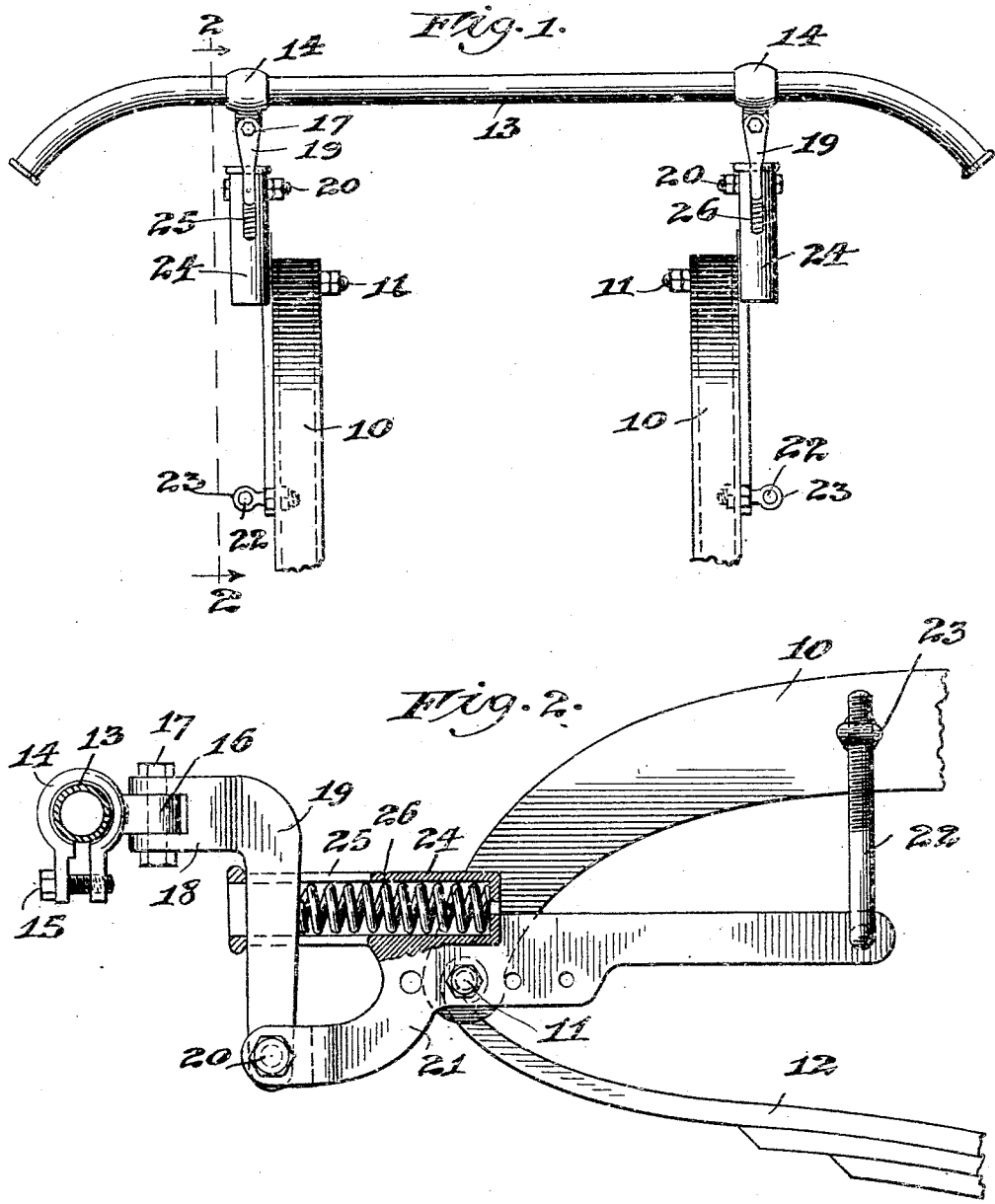

ALLAN L. McGREGOR, OF DULUTH, MINNESOTA.

AUTOMOBILE-BUFFER.

958,420. Specification of Letters Patent. Patented May 17, 1910.

Application filed September 29, 1909. Serial No. 520,115.

*To all whom it may concern:*

Be it known that I, ALLAN L. MCGREGOR, a citizen of the United States, residing at Duluth, in the county of St. Louis and State of Minnesota, have invented certain new and useful Improvements in Automobile-Buffers, of which the following is a specification.

This invention relates to buffers or bumpers for use on automobiles, and has reference more particularly to that type of buffer now extensively in use, wherein a horizontally disposed buffer-bar is yieldably mounted upon and in advance of the usual springs supporting the fore-part of the automobile body.

The invention has for its general object to provide a simple and improved device of this type capable of ready attachment to automobile frames and securely held in operative position, notwithstanding the jar and vibration to which such devices are subjected, which imposes a severe strain upon the attaching parts. In many devices of this character the buffer-bar proper is carried by a pair of inwardly extending rods or arms that are slidably mounted in guides attached to the automobile frame, and are backed by cushioning springs. My present invention departs from this type of buffer in that the buffer-bar proper is carried by a pair of vertically extending arms that are pivoted at their lower ends to supporting bars rigidly secured to the frame, thus giving the buffer-bar an oscillatory lateral movement, said arms being backed by cushioning springs which are preferably located in suitable housings formed on or formed integral with the main supporting bars.

The invention, and its mode of operation and advantages, will be readily understood from a consideration of the following description, taken in connection with the accompanying drawing forming a part of this specification, in which—

Figure 1 is a top plan view of my improved automobile buffer, showing the same as mounted on the forward end of the vehicle frame. Fig. 2 is an enlarged cross-sectional view on the line 2—2 of Fig. 1, the spring housing being shown in vertical axial section.

Referring to the drawing, 10 designates the forward and downwardly curved end portions of the usual side bars and frame, to the forward ends of which are pivoted by hinge-bolts 11 the usual semi-elliptic springs 12.

13 designates the buffer-bar in the usual form, the same being directly mounted in collars 14 clamped thereto by bolts 15, each of said collars carrying an inwardly projecting hinge-lug 16 that is pivotally connected by a vertical hinge-bolt 17 with the forked horizontal upper end 18 of an elbow arm 19. These elbow arms are pivotally supported at their lower ends as by pivot-bolts 20 to the forward downwardly turned ends of a pair of main supporting bars 21, which latter, in turn, are mounted intermediate their ends upon the pivot-bolts 11 of the vehicle, and are rigidly and adjustably supported by links 22 which connect the inner or rear ends of said supporting bars with the side bars 10 of the frame through threaded eye-bolts 23 mounted in the latter. Each of the supporting bars 21 has formed integrally therewith or strongly secured thereto directly above its forward portion a spring barrel or housing 24, the forward portion of which is longitudinally slotted in a vertical plane, as shown at 25 to accommodate the buffer-carrying arm 19. These arms 19 are backed by coiled compression springs 26 mounted in said spring housings and confined between the inner ends of the housings and the backs of the arms.

From the foregoing it will be apparent that when the buffer-bar 13 encounters an obstacle it will yield laterally in an inward direction by reason of the angular or swinging movement which the arms 19 have about their pivots 20, the springs 26, of course, opposing a yielding or elastic resistance to such movement. By this arrangement of the parts I dispense with guides for accommodating the reciprocating movement of the usual bar-carrying arms which, in some cases, interferes more or less with the free action of the springs of the vehicle, and substitute therefor an angularly swinging direct support for the buffer-bar that is mounted on devices rigidly connected to the forward end of the vehicle frame.

It will be apparent to those skilled in the art that the particular forms and relative arrangements of the parts described might be varied in detail without involving any departure from the principle of the invention or sacrificing any of the advantages thereof. Hence, I do not limit the invention to the particular structure herein disclosed, except to the extent clearly indicated in specific claims.

I claim:

1. An automobile buffer, comprising in combination a buffer-bar, supporting bars therefor secured to the forward end of the vehicle, a pair of arms pivoted at one end to said supporting bars and at their other ends connected to said buffer-bar, slotted guides rigid with said supporting bars laterally engaging and supporting said arms, and cushioning springs backing said arms, substantially as described.

2. An automobile buffer, comprising in combination a buffer-bar, supporting bars therefor secured to the forward end of the vehicle and provided with spring housings, a pair of arms pivoted at one end to said supporting bars and at their other ends connected to said buffer-bar, and cushioning springs in said housings backing said arms, substantially as described.

3. An automobile buffer, comprising in combination a buffer-bar, supporting bars therefor secured to the forward end of the vehicle and provided with vertically slotted spring housings, a pair of arms pivoted at one end to said supporting bars and extending through the slots of said housings and at their other ends connected to said buffer-bar, and cushioning springs in said housings backing said arms, substantially as described.

4. An automobile buffer, comprising in combination a buffer-bar, supporting bars therefor secured to the forward end of the vehicle and provided with vertically slotted spring housings, a pair of vertical arms pivoted at their lower ends to the forward ends of said supporting bars and extending through the slots of said housings and at their other ends connected to said buffer-bar, and cushioning springs in said housings backing said arms, substantially as described.

5. The combination with the side bar and semi-elliptic spring of an automobile pivotally joined at their forward ends, of a buffer mechanism comprising a pair of supporting bars mounted on the pivot-bolts of said side bars and springs and extending both forwardly and rearwardly thereof, each of said supporting bars being formed with a slotted spring housing above the forwardly projecting portion of said bar, links connecting the rearwardly projecting portions of said supporting bars to the side frames, a pair of upright arms pivoted at their lower ends to the forward ends of said supporting bars and extending through the slots of said housings and at their upper ends connected to said buffer-bar, and compression springs in said housings backing said arms, substantially as described.

ALLAN L. McGREGOR.

Witnesses:
SAMUEL N. POND,
MATTIE B. BLISS.